United States Patent [19]

Patel et al.

[11] Patent Number: 4,988,518

[45] Date of Patent: Jan. 29, 1991

[54] CHEWING GUM WITH LIQUID FLAVOR ADDED TO THE ROLLING COMPOUND AND METHOD

[75] Inventors: Mansukh M. Patel, Downers Grove; David Witkewitz, Ridgeview; Vasek J. Kures, Willow Springs, all of Ill.

[73] Assignee: Wm. Wrigley Jr. Company, Chicago, Ill.

[21] Appl. No.: 458,051

[22] Filed: Dec. 28, 1989

[51] Int. Cl.$^5$ .............................. A23G 3/30
[52] U.S. Cl. .......................... 426/5; 426/103; 426/548; 426/658; 426/804; 426/651
[58] Field of Search ......................... 426/3–6, 426/103, 548, 658, 533, 804, 651

[56] References Cited

U.S. PATENT DOCUMENTS

| | | | |
|---|---|---|---|
| 2,305,960 | 12/1942 | Frover | 426/5 |
| 3,681,087 | 8/1972 | Johnson | 426/5 |
| 3,962,468 | 6/1976 | Pischke et al. | 426/548 |
| 4,127,677 | 11/1978 | Fronczkowski et al. | 426/5 |
| 4,228,198 | 10/1980 | Burge et al. | 426/548 |
| 4,292,336 | 9/1981 | Latymer | 426/548 |
| 4,374,858 | 2/1983 | Glass | 426/548 |
| 4,412,984 | 11/1983 | Van der Loo et al. | 426/548 |
| 4,662,076 | 12/1985 | Arnold | 426/5 |
| 4,681,766 | 7/1987 | Huzinec | 426/5 |

*Primary Examiner*—Jeanette Hunter
*Attorney, Agent, or Firm*—Willian Brinks Olds Hofer Gilson & Lione

[57] ABSTRACT

A chewing gum product having a core portion including chewable gum base, sweetener and flavoring. The core portion has deposited on its surface a rolling compound including a powdered ingredient selected from the group consisting of sucrose, mannitol, starch, calcium carbonate, talc, lactitol, palatinit, lactose, and combinstions thereof. The rolling compound further includes between about 0.1 and about 2.5 weight percent of a liquid flavor. The rolling compound is substantially free of anti-caking agents and flow agents.

23 Claims, No Drawings

CHEWING GUM WITH LIQUID FLAVOR ADDED TO THE ROLLING COMPOUND AND METHOD

BACKGROUND OF THE INVENTION

The present invention relates to chewing gum products. More particularly, the invention relates to chewing gum products which have a rolling compound which includes a liquid flavor.

For many years it has been known to dust products such as chewing gum with materials such as powdered sucrose to improve appearance and initial taste. The dusting also is intended to prevent the chewing gum from sticking to the fingers when handled, or to the wrapper.

The material which is used to dust chewing gum can be referred to as a "dusting compound". The same compound can also be referred to as a "rolling compound" because the compound is used to make the gum more manageable during processing, including rolling and sheeting. Because the two terms are interchangeable, the term "rolling compound" will be used herein for convenience.

At least two patents have issued which teach methods of enhancing rolling compounds with high potency sweeteners so as to enhance the overall sweetness perception of the chewing gum. U.S. Pat. No. 4,374,858 to Glass et al. discloses aspartame added to the rolling compound of chewing gum. U.S. Pat. No. 4,562,076 to Arnold et al. discloses the use of thaumatin and/or monellin in rolling compounds.

Some work has been done in the past to enhance the flavor perception of chewing gum products by adding flavors to the rolling compound. However, for the most part, these attempts have employed flavors in powdered form, e.g. spray dried or encapsulated flavors, which powdered forms can be more expensive and/or less desirable in terms of flavor quality.

It is thought that one reason for using flavors in powdered form is the necessity to keep the rolling compound in a consistently free flowing state. In particular, because rolling compounds are used with rolling and sheeting equipment, it is important that a rolling compound have consistent flow characteristics, e.g. resistance to caking, so as to avoid equipment malfunction. Consistent flow characteristics are also important to insure uniformity of product appearance. That is, caking or lump forming can produce unevenness in the dusting of the chewing gum product.

In the PCT Publication No. WO 89-07895 by Patel et al., a chewing gum with a rolling compound made from xylitol to enhance sweetness is disclosed. The addition of high potency sweeteners, colors, and flavors to the xylitol rolling compound is also mentioned. It is stated that when the rolling compound is a "carrier" for a liquid flavor, the liquid flavor should be added after the addition of an anti-caking agent. Unfortunately, anti-caking agents can impart an undesirable texture and/or taste to the chewing gum product.

SUMMARY OF THE INVENTION

The present invention is directed to a chewing gum product which has a core portion including chewable gum base, sweetener and flavoring. The core portion has deposited on its surface a rolling compound including a powdered ingredient selected from the group consisting of sucrose, mannitol, starch, calcium carbonate, talc, lactitol, palatinit, lactose, and combinations thereof. The rolling compound further includes between about 0.1 and about 2.5 weight percent of a liquid flavor. The rolling compound is substantially free of anti-caking agents and flow agents.

The present invention is also directed to a method of making a chewing gum product in which method the rolling compound is made by mixing a powdered ingredient selected from the group consisting of sucrose, mannitol, starch, calcium carbonate, talc, lactitol, palatinit, lactose, and combinations thereof with a liquid flavor in an amount between about 0.1 and about .2.5 percent by weight of the rolling compound. This rolling compound is substantially free of anti-caking agents and flow agents. This rolling compound is applied to the core portion described above.

One advantage of the present invention is that it allows for the addition of a liquid flavor to the rolling compound which thereby enhances the flavor perception of the chewing gum product.

A further advantage is that the rolling compound is substantially free of anti-caking and flow agents which can negatively impact the flavor and/or texture of the chewing gum product.

It is also an advantage of the present invention that liquid flavors are used in the rolling compound since spray dried flavors are typically more expensive than liquid flavors The flavor quality of liquid flavors is also generally higher than that of spray dried flavors.

DETAILED DESCRIPTION OF THE PREFERRED EMBODIMENTS

The rolling compound of the present invention includes a powdered ingredient selected from the group consisting of sucrose, mannitol, starch, calcium carbonate, talc, lactitol, palatinit, lactose, and combinations thereof. Preferably, the rolling compound is made from powdered sucrose. Most preferably, the powdered sucrose has a particle size such that between 2 and 7 weight percent are retained on a U.S. Standard Sieve No. 35, between 92 and 97 weight percent are retained on a U.S. Standard Sieve No. 100, and between 0.5 and 2.5 weight percent passes through a U.S. Standard Sieve No. 100. Alternatively, powdered dextrose, fructose, and combinations thereof can also be employed.

The rolling compound also includes between about 0.1 and about 2.5 weight percent of a liquid flavor. More preferably, the liquid flavor constitutes between about 0.2 and about 1.0 weight percent, most preferably between about 0.25 and about 0.5 weight percent. It has been found that at a level of about 3 weight percent, the rolling compound begins to cake and form lumps.

The liquid flavor in the rolling compound can be selected from a wide variety of flavors in a liquid form. Preferably, the liquid flavor is selected from the group consisting of spearmint oil, peppermint oil, wintergreen oil, cinnamon oil, fruit flavors, as well as combinations thereof Most preferably, the flavor is spearmint oil.

Preferably the liquid flavor in the rolling compound is the same as that used in the core portion. Alternatively, a different flavor can be used to achieve a predetermined flavor effect.

Strong flavors, such as cinnamon, require lesser amounts added to the rolling compound while mild flavors require greater amounts.

The liquid flavor can be added to the powdered ingredient of the rolling compound in any manner which insures uniform dispersion. Most preferably, the liquid flavor is added in a low shear, high speed mixer such as a Littleford blender. Complete and uniform mixing is desirable.

As mentioned above, anti-caking agents in the rolling compound can have undesirable effects on the taste and/or texture of the ultimate chewing gum. Typically, anti-caking agents are those compounds added to a powder to avoid agglomeration of the powder caused by the effects of moisture and the like. Flow agents are also sometimes used to increase a powder's flowability. Typically, flow agents act by reducing friction in the powder. Unfortunately, flow agents can also have undesirable effects on the taste and/or texture of the chewing gum. Consequently, the rolling compound of the present invention is substantially free of both anti-caking agents and flow agents. By the phrase "substantially free of" it is meant that the presence of anti-caking and/or flow agents is not discernible by a consumer of the chewing gum product. Typically, the threshold for discernment by the consumer is below about 0.1 percent by weight of the gum base.

Other ingredients may also be added to the rolling compound of the present invention. Such optional ingredients include but are not limited to spray dried flavors, encapsulated flavors, plated flavors, colors, high-potency sweeteners such as aspartame, alitame, sucralose, acesulfame, and the like.

The composition and manufacture of the core portion of the chewing gum product of the present invention is seen to be noncritical. That is, the inventive rolling compound can be applied to conventional chewing gum formulations. The inventive rolling compound can also be applied to the core portion in a conventional manner.

In general, a chewing gum composition typically comprises a water soluble bulk portion and a water insoluble chewable gum base portion and, typically flavoring agents. The water soluble portion dissipates with a portion of the flavoring agent over a period of time during chewing. The gum base portion is retained in the mouth throughout the chew.

The insoluble gum base generally comprises elastomers, resins, fats and oils, waxes, softeners and inorganic fillers. Elastomers may include polyisobutylene, isobutylene-isoprene copolymer, styrene butadiene rubber as well as natural latexes such as chicle. Resins include polyvinylacetate and terpene resins. Fats and oils may also be included in the gum base, including tallow, hydrogenated and partially hydrogenated vegetable oils, and cocoa butter. Commonly employed waxes include paraffin, microcrystalline and natural waxes such as beeswax and carnauba According to the preferred embodiment of the present invention the insoluble gum base constitutes between about 5 to about 95 percent by weight of the gum. More preferably the insoluble gum base comprises between 10 and 50 percent by weight of the gum and most preferably about 20 to about 35 percent by weight of the gum.

The gum base typically also includes a filler component. Examples of suitable filler components include calcium carbonate, magnesium carbonate, talc, dicalcium phosphate and the like. The filler may constitute between about 5 to about 60 percent by weight of the gum base. Preferably, the filler comprises about 5 to about 50 percent by weight of the gum base.

Gum bases typically also contain softeners, including glycerol monostearate and glycerol triacetate. Further, gum bases may also contain optional ingredients such as antioxidants, colors, and emulsifiers. The present invention contemplates employing any commercially acceptable gum base.

The water soluble portion comprises primarily sweet bulking agents which are powdered sugars or sugar alcohols such as sucrose, glucose, dextrose, fructose, lactose, sorbitol, mannitol, xylitol, and the like.

The water soluble portion of the chewing gum may further comprises softeners, sweeteners, flavoring agents and combinations thereof. Softeners are added to the chewing gum in order to optimize the chewability and mouth feel of the gum. Softeners, also known in the art as plasticizers or plasticizing agents, generally constitute between about 0.5 to about 15.0 percent by weight of the chewing gum. Softeners contemplated by the present invention include glycerin, lecithin, and combinations thereof. Further, aqueous sweetener solutions such as those containing sorbitol, hydrogenated starch hydrolysates, corn syrup and combinations thereof may be used as softeners and binding agents in gum.

A flavoring agent is typically present in the chewing gum in an amount within the range of from about 0.1 to about 10.0 weight percent and preferably from about 0.5 to about 3.0 weight percent of the gum. The flavoring agents may comprise essential oils, synthetic flavors, or mixture thereof including but not limited to oils derived from plants and fruits such as citrus oils, fruit essences, peppermint oil, spearmint oil, clove oil, oil of wintergreen, anise, and the like. Artificial flavoring componens are also contemplated Those skilled in the art will recognize that natural and artificial flavoring agents may be combined in any sensorially acceptable blend. All such flavors and flavor blends are contemplated by the present invention.

Optional ingredients such as colors, emulsifiers and pharmaceutical agents may be added to the chewing gum.

In general, chewing gum is manufactured by sequentially adding the various chewing gum ingredients to a commercially available mixer known in the art. After the ingredients have been thoroughly mixed, the gum mass is discharged from the mixer and shaped into the desired form such as by rolling into sheets and cutting into sticks, extruding into chunks or casting into pellets.

Generally, the ingredients are mixed by first melting the gum base and adding it to the running mixer. The base may also be melted in the mixer itself. Color or emulsifiers may also be added at this time. A softener such as glycerin may also be added at this time along with syrup and a portion of bulking agent. Further portions of the bulking agent may then be added to the mixer. A flavoring agent is typically added with the final portion of the bulking agent. The twice coated sweetener of the present invention is preferably added after the final portion of bulking agent and flavor have been added.

The entire mixing procedure typically takes from five to fifteen minutes, but longer mixing times may sometimes be required. Those skilled in the art will recognize that many variations of the above described procedure may be followed After the gum is mixed, it is shaped and processed into individual pieces. In the case of gum intended to be sold in stick or tab form, the gum mass is typically dusted on both sides with the rolling compound of the present invention as it passes into the forming equipment. The dusted gum mass is then rolled and cut by a series of rollers to form the mass into sheets of the desired thickness and width. Following this, the rolled gum mass is cut or scored to form individual sticks or tabs. As is well known in the gum making industry, the rolling compound may be applied at various stages of the rolling process to prevent sticking of the gum mass to the equipment and to facilitate handling of the gum mass. The rolling compound of the present invention can be used in any stage of the process. After tempering, the sticks are wrapped.

Although dusting is not necessary for gum which is to be sold in chunk form, the rolling compound is still useful in the handling the chunks, particularly during wrapping and unwrapping.

Preferably, the rolling compound is utilized by applying it to the surface of both sides of the gum product, prior to rolling if the product is rolled. The rolling compound will preferably constitute from about 0.5 to about 7 percent, and more preferably between about 2 and about 3 percent by weight of the final chewing gum product Stated another way, for a typical gum to be sold in stick form which weighs about 1880 grams per square meter, between about 9 to 126 grams of rolling compound should be present per square meter of the gum, and more preferably, the rolling compound should comprise between about 36 and about 54 grams per square meter. Of this amount, half is applied to each side of the gum.

EXAMPLES

A batch of rolling compound was made by mixing 149.4 grams of powdered sucrose, such as that described above, with 0.6 grams of spearmint oil, i.e. 0.4 weight percent.

A first quantity of spearmint flavored chewing gum with the formula described below was sheeted out with the inventive rolling compound to a level of about 3 percent by weight of the final product. A second quantity of the same spearmint flavored chewing gum was sheeted with plain powdered sucrose to the same level.

| INGREDIENT | WEIGHT PERCENT |
| --- | --- |
| Sucrose | 53.1 |
| Base | 20.7 |
| Corn Syrup | 14.6 |
| Glycerin | 0.9 |
| Dextrose | 10.1 |
| Spearmint Flavor | 0.6 |

When the two chewing gums were compared in a formal blind taste test with trained chewing gum experts, it was found that the chewing gum with the inventive rolling compound showed a higher initial flavor impact as well as a better balance of flavor and sweeteners in the intermediate chew, i.e. between 0.5 and 1.5 minutes.

In summary, a chewing gum product has been described which includes a rolling compound with liquid flavor added. Although specific embodiments and examples have been described herein, it should be born in mind that these have been provided by way of explanation and illustration and that the present invention is not limited thereby. Certainly, modifications which are within the ordinary skill in the art to make are considered to lie within the scope of the invention as defined by the following claims, including all equivalents.

I claim:

1. A chewing gum product, having a core portion comprising chewable gum base, sweetener and flavoring, and further having deposited on the surface of said core portion, a rolling compound comprising a powdered ingredient selected from the group consisting of sucrose, mannitol, starch, calcium carbonate, talc, lactitol, palatinit, lactose, and combinations thereof, said rolling compound further comprising between about 0.1 and about 2.5 weight percent of a liquid flavor, and said rolling compound being substantially free of anti-caking agents and flow agents.

2. The chewing gum product of claim 1 wherein the liquid flavor in the rolling compound is selected from the group consisting of peppermint oil, spearmint oil, wintergreen oil, cinnamon oil, fruit flavors, and combinations thereof.

3. The chewing gum product of claim 1 wherein the liquid flavor comprises between about 0.2 and about 1.0 weight percent of the rolling compound.

4. The chewing gum product of claim 1 wherein the liquid flavor comprises about 0.25 weight percent of the rolling compound.

5. The chewing gum product of claim 1 wherein the rolling compound comprises between about 0.5 and about 7 percent by weight of the chewing gum product.

6. The chewing gum product of claim 1 wherein the rolling compound comprises between about 2 and about 3 percent by weight of the chewing gum product 7. The chewing gum product of claim 1 wherein the rolling compound further comprises a high-potency sweetener.

8. The chewing gum product of claim 7 wherein the high-potency sweetener is selected from the group consisting of aspartame, alitame, sucralose, and acesulfame.

9. A chewing gum product, having a core portion comprising chewable gum base, sweetener and flavoring, and further having deposited on the surface of said core portion, a rolling compound comprising powdered sucrose, said rolling compound further comprising between about 0.1 and about 2.5 weight percent of a liquid flavor selected from the group consisting of peppermint oil, spearmint oil, wintergreen oil, cinnamon oil, fruit flavors, and combinations thereof, and said rolling compound being substantially free of anti-caking agents and flow agents.

10. The chewing gum product of claim 9 wherein the liquid flavor comprises between about 0.2 and about 1.0 weight percent of the rolling compound 11. The chewing gum product of claim 9 wherein the liquid flavor comprises about 0.25 weight percent of the rolling compound 12. The chewing gum product of claim 9 wherein the rolling compound comprises between about 0.5 and about 7 percent by weight of the chewing gum product.

13. The chewing gum product of claim 9 wherein the rolling compound comprises between about 2 and about 3 percent by weight of the chewing gum product.

14. The chewing gum product of claim 9 wherein the rolling compound further comprises a high-potency sweetener.

15. The chewing gum product of claim 14 wherein the high-potency sweetener is selected from the group consisting of aspartame, alitame, sucralose, and acesulfame.

16. A method of making a chewing gum product comprising the steps of:
   providing a rolling compound by mixing a powdered ingredient selected from the group consisting of sucrose, mannitol, starch, calcium carbonate, talc, lactitol, palatinit, lactose, and combinations thereof, with a liquid flavor in an amount between about 0.1 and about 2.5 percent by weight of the rolling compound, said rolling compound being substantially free of anti-caking agents and flow agents;

providing a core portion comprising chewable gum base, sweetener and flavoring; and depositing said rolling compound on the surface of said core portion.

17. The method of claim 16 wherein the liquid flavor in the rolling compound is selected from the group consisting of peppermint oil, spearmint oil, wintergreen oil, cinnamon oil, fruit flavors, and combinations thereof.

18. The method of claim 16 wherein the liquid flavor comprises between about 0.2 and about 1.0 weight percent of the rolling compound.

19. The method of claim 16 wherein the liquid flavor comprises about 0.25 weight percent of the rolling compound.

20. The method of claim 16 wherein the rolling compound comprises between about 0.5 and about 7 percent by weight of the chewing gum product.

21. The method of claim 16 wherein the rolling compound comprises between about 2 and about 3 percent by weight of the chewing gum product.

22. The method of claim 16 wherein the rolling compound further comprises a high-potency sweetener.

23. The method of claim 16 wherein the high-potency sweetener is selected from the group consisting of aspartame, alitame, sucralose, and acesulfame.

* * * * *

UNITED STATES PATENT AND TRADEMARK OFFICE
CERTIFICATE OF CORRECTION

PATENT NO. : 4,988,518
DATED : January 29, 1991
INVENTOR(S) : Mansukh M. Patel et al.    Page 1 of 2

It is certified that error appears in the above-identified patent and that said Letters Patent is hereby corrected as shown below:

IN THE ABSTRACT

In line 7 of the Abstract, please delete "combinstions" and substitute therefor --combinations--.

In column 2, line 27, after the first occurrence of "flavors" please insert --.--.

In column 2, line 58, after "thereof" please insert --.--.

In column 3, line 51, after "carnauba" please insert --.--.

In column 4, line 30, please delete "componens" and substitute therefor --components--; and after "contemplated" please insert --.--.

In column 4, line 61, after "followed" please insert --.--.

In column 5, line 12, before "handling" please delete "the".

UNITED STATES PATENT AND TRADEMARK OFFICE
CERTIFICATE OF CORRECTION

PATENT NO. : 4,988,518
DATED : January 29, 1991
INVENTOR(S) : Mansukh M. Patel et al.

Page 2 of 2

It is certified that error appears in the above-identified patent and that said Letters Patent is hereby corrected as shown below:

Column 6:

In claim 6, line 3, after "product" please insert --.--.

In claim 10, line 3, after "compound" please insert --.--.

In claim 11, line 3, after "compound" please insert --.--.

Signed and Sealed this

Twelfth Day of January, 1993

Attest:

DOUGLAS B. COMER

*Attesting Officer*       Acting Commissioner of Patents and Trademarks